Dec. 13, 1966   E. T. JAGGER ETAL   3,290,725
APPARATUS FOR MOULDING RUBBER AND LIKE ARTICLES
Filed June 19, 1964
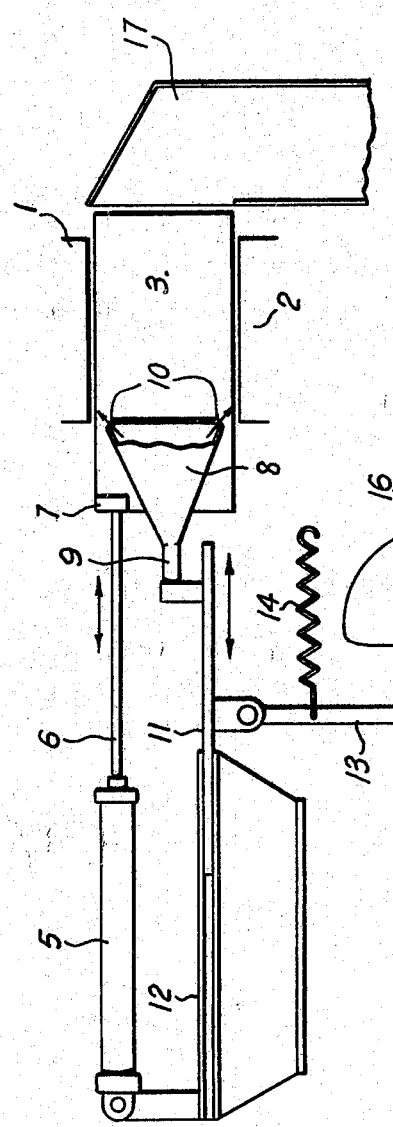
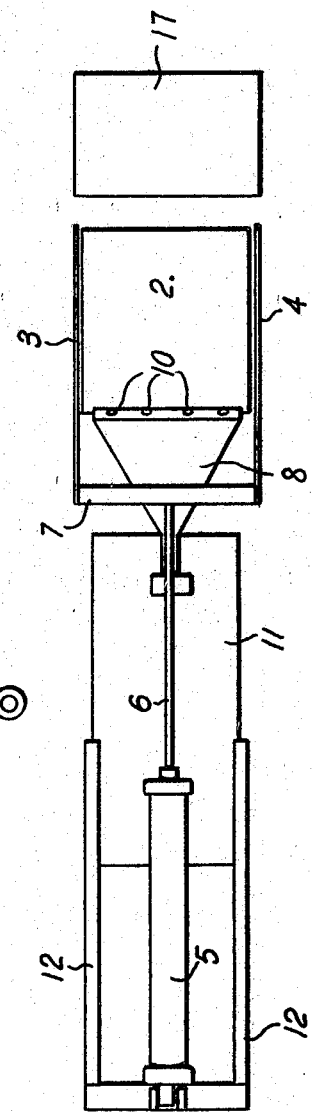

United States Patent Office 3,290,725
Patented Dec. 13, 1966

3,290,725
APPARATUS FOR MOULDING RUBBER AND LIKE ARTICLES
Ernest T. Jagger and Edward I. Hunter, Newcastle upon Tyne, England, assignors to George Angus & Company Limited, Newcastle upon Tyne, England
Filed June 19, 1964, Ser. No. 376,396
Claims priority, application Great Britain, June 21, 1963, 24,744/63
5 Claims. (Cl. 18—2)

This invention relates to moulding rubber and like articles and provides an improved apparatus for removing them from moulding dies.

The invention is applied to the moulding of articles in one or more cavities each of which is provided partly in one and partly in another of a pair of dies. The dies are loaded with plastic material, either as pre-formed blanks or as sheet or other plastic stock, closed together under suitable pressure, heated and then opened apart for removal of the moulding or mouldings.

When the pair of dies is opened apart, each moulding may be retained in one die or the other or may be dislodged as the dies move apart.

With single-cavity dies, removal of the moulding by hand from between the opened dies is a simple operation but with multiple-cavity dies, with which the invention is particularly concerned, hand removal is not only laborious but, particularly with small mouldings, may cause distortion of the mouldings if, as in high-speed moulding, vulcanisation or like curing is not completed in the dies but is finished subsequently.

Consequently, removal of mouldings from dies is often effected by a blast of compressed air directed on to each die face and into the cavities from a fixed nozzle or from a nozzle held and directed by a workman. Such air-blast removal is not entirely satisfactory, it often being a matter of chance whether all the mouldings are satisfactorily removed and collected.

Apparatus according to the invention comprises a pair of side walls, means for moving the side walls into position spaced apart and closing opposite sides of a space between a pair of opened-apart dies, an air-blast nozzle, means for traversing the nozzle across the space between and parallel to the spaced-apart side walls and means, facing the nozzle, for gathering the mouldings.

The nozzle is preferably of such construction that it directs multiple air-blasts obliquely forward on to both die faces, so that the air-blasts penetrate behind and eject mouldings from the part-cavities in both dies, and the traverse of the nozzle is preferably completely across the space between the dies so that the air-blasts impinge closely upon every part of the die faces.

The air-blast can thus effect die-cleaning as well as the ejection of the mouldings and, should there be any tendency for mouldings to build-up or jam between the dies, the air-blasts, or the nozzle itself, will ensure ejection and gathering of the mouldings.

In one construction, the air-blast nozzle is in the form of a hollow pyramid or cone with an air inlet at its apex and small air jet apertures at the periphery of its base, preferably along two opposite edge parts thereof, the nozzle being arranged to be traversed base-forward in the direction of its axis. Alternatively, the nozzle could be of H form with air jet apertures along its two limbs and an air inlet at the centre of its cross bar.

In a pyramidal or conical nozzle the pressure of the air delivered to each air jet aperture is the same and no differences arise between the pressures at the different jet holes even if the holes are spaced at different distances from the air inlet into the nozzle.

By providing the edges of the nozzle base in which the jet holes are provided with facets across the angle, it can be ensured that correctly directed holes can be accurately made, such as by drilling.

A construction has been contemplated in which the side walls are hinged and are swung open, like a pair of doors, through the space between a pair of opened-apart dies to define a path between the dies for a nozzle which is then traversed, with or between the side walls, across the space between the dies.

In a preferred construction however, the side walls are carried by a frame extending from a pneumatic ram, or other linear motor, so as to be moved along two opposite sides of the space between the opened dies, and subsequently retracted before the dies close, and the nozzle is independently traversed by a linear actuator, preferably a slide operated by a spring-loaded lever having a follower bearing on a rotary cam.

An example of such a preferred construction is illustrated on the accompanying drawing, in which:

FIG. 1 is a side elevation and
FIG. 2 is a plan.

The drawing shows a pair of rectangular dies 1 and 2, with multiple cavities (not shown), opened-apart after a moulding operation.

A pair of parallel, spaced-apart, plane side walls 3 and 4 have been moved along two opposite sides of the space between the dies by a pneumatic ram 5 on the piston rod 6 of which the side walls are carried by a cross frame 7.

A pyramidal air blast nozzle 8, having an inlet 9 for compressed air, delivered through a flexible hose (not shown), and inclined jet apertures 10 along facets across the upper and lower edges of its base, is carried by a slide plate 11 in channel guides 12.

The slide plate 11 has pivoted thereto a lever 13 which swings about a fixed pivot at its lower end and is loaded by a helical tension spring 14 so that a follower 15 on the lever bears on a rotary cam 16 for reciprocating the slide plate 11 to traverse the nozzle 8 across the space between the dies.

Facing the nozzle 8, at the opposite side of the space between the dies, is the mouth of a chute 17 for delivering mouldings ejected from the dies to a vulcanisation chamber, for completion of partial vulcanisation effected in the dies.

The apparatus as illustrated is suitable for use with an automatic moulding machine, the pneumatic ram 5 and cam 16 being operated cyclically to fit in with operations in which the dies are loaded, closed and opened for ejection of the mouldings.

The apparatus of the present invention is suitable for use in the moulding of articles of natural or synthetic rubber or other material which can be moulded in the same way as rubber.

We claim:

1. In moulding apparatus comprising at least one pair of dies with means for closing the dies together to form mouldings and for opening the dies apart to a spaced-apart position in which the mouldings are accessible from the space between the dies; the improvement which consists in means for removing the mouldings from said space and comprising a pair of side walls, means for moving said side walls into position spaced apart and closing two opposite sides of the effective moulding space between said dies, an air-blast nozzle, means for traversing said nozzle across said space between and in a direction parallel to said walls and means, facing said nozzle, for gathering the mouldings.

2. Moulding apparatus according to claim 1, in which said nozzle has air jet apertures directed obliquely forward on to both said dies.

3. Moulding apparatus according to claim 2, in which said nozzle has at least one row of said jet apertures for each of said dies and an air inlet in common to all said jet apertures.

4. Moulding apparatus according to claim 1, in which said means for gathering the mouldings is a chute having a mouth which closes-off said space at a third side thereof between said two opposite sides and facing said nozzle.

5. In moulding apparatus comprising at least one pair of dies with means for closing the dies together to form mouldings and for opening the dies apart to a spaced-apart position in which the mouldings are accessible from the space between the dies, the improvement which consists in means for removing the mouldings from said space and comprising a pair of parallel, spaced-apart, plane side walls for said space, means for traversing said side walls into and from a position in which they close two opposite sides of the effective moulding space, between said dies, an air-blast nozzle having at least one row of air jet apertures directed obliquely towards each of said dies and an air inlet in common to all said jet apertures, means for traversing said nozzle parallel to and between said side walls to and fro across said space and a chute having a mouth which closes-off said space at a third side thereof between said two opposite sides and facing said nozzle.

References Cited by the Examiner
UNITED STATES PATENTS

| | | | |
|---|---|---|---|
| 1,751,430 | 3/1930 | Thomson | 264—335 X |
| 2,155,316 | 4/1939 | Lauterbach. | |
| 2,251,135 | 7/1941 | Ikanayan et al. | |
| 2,710,988 | 6/1955 | Willcox et al. | |
| 2,744,286 | 5/1956 | Carpenter et al. | 18—2 X |
| 3,040,378 | 6/1962 | Rodgers et al. | 18—2 X |
| 3,128,499 | 4/1964 | Smolenski | 18—2 |

J. SPENCER OVERHOLSER, *Primary Examiner.*

J. HOWARD FLINT, JR., *Examiner.*